(12) United States Patent
Nagai

(10) Patent No.: US 6,720,103 B1
(45) Date of Patent: Apr. 13, 2004

(54) FUEL CELL

(75) Inventor: Osamu Nagai, Hiratsuka (JP)

(73) Assignee: NOK Corporation, Tokyo (JP)

( * ) Notice: Subject to any disclaimer, the term of this patent is extended or adjusted under 35 U.S.C. 154(b) by 233 days.

(21) Appl. No.: 09/936,246

(22) PCT Filed: Aug. 30, 2000

(86) PCT No.: PCT/JP00/05855

§ 371 (c)(1),
(2), (4) Date: Sep. 7, 2001

(87) PCT Pub. No.: WO01/17048

PCT Pub. Date: Mar. 8, 2001

(30) Foreign Application Priority Data

Sep. 1, 1999 (JP) .............................................. 11-246915

(51) Int. Cl.$^7$ ................................................ H01M 2/08
(52) U.S. Cl. .......................................................... 429/36
(58) Field of Search ..................................... 429/35, 36

(56) References Cited

U.S. PATENT DOCUMENTS

| | | | | |
|---|---|---|---|---|
| 4,748,092 A | * | 5/1988 | Hekal ........................... | 429/35 |
| 6,057,054 A | * | 5/2000 | Barton et al. .............. | 429/35 X |
| 6,261,711 B1 | * | 7/2001 | Matlock et al. ........... | 429/35 X |
| 6,316,139 B1 | * | 11/2001 | Uchida et al. ................. | 429/36 |

FOREIGN PATENT DOCUMENTS

| | | | |
|---|---|---|---|
| EP | 0 914 922 A1 | 5/1999 | ............ H01M/8/02 |
| EP | 933826 | * 8/1999 | ............ H01M/8/02 |
| JP | 10-151973 | * 8/1985 | ............ H01M/8/02 |
| JP | 7-249417 A | 9/1995 | ............ H01M/8/02 |
| JP | 8-279364 A | 10/1996 | ............ H01M/8/12 |
| JP | 9-63622 A | 3/1997 | ............ H01M/8/10 |
| JP | 10-55813 A | 2/1998 | ............ H01M/8/10 |
| JP | 10-302814 A | 11/1998 | ............ H01M/8/02 |
| JP | 11-129396 A | 5/1999 | ............ H01M/8/02 |
| JP | 2000-21422 A | 1/2000 | ............ H01M/8/02 |

* cited by examiner

*Primary Examiner*—Stephen Kalafut
(74) *Attorney, Agent, or Firm*—Butzel Long

(57) ABSTRACT

Unit cell 1 comprises a pair of counterposed separators 2 and 3 and a membrane-electrode assembly (MEA) provided between the separators, MEA comprising polymeric electrolyte membrane 5 having a predetermined thickness and two reactor electrode layers 4 and 4' each with a catalyst layer sandwiching the polymeric electrolyte membrane, where the polymeric electrolyte membrane and spacer sheet 5*a* having a predetermined thickness are vertically sandwiched by a pair of counterposed elastic resin gasket sheets 6 and 7, thereby supporting MEA, and gaskets 8 and 9 of inverted V shape made from cured rubber are integrally formed on the outer surfaces of the gasket sheets, respectively, and brought into tight contact with inner surfaces 2*a* and 3*a* of separators 2 and 3, respectively, thereby attaining desired sealing.

9 Claims, 7 Drawing Sheets

FUEL CELL

TECHNICAL FIELD

The present invention relates to a fuel cell, which is an electrochemical cell capable of continuously converting chemical energy generated between fuel and an oxide to electrical energy.

BACKGROUND ART

Generally, a fuel cell comprises a stack of several tens to several hundred of unit cells laid one upon another to generate a large quantity of electricity, where each unit cell comprises a pair of counterposed current collector electrodes (separators) and a membrane-electrode assembly (which will be hereinafter referred to as MEA) comprising a polymeric electrolyte membrane and two reactor electrode layers each with a catalyst layer sandwiching the polymeric electrolyte, membrane, and MEA is provided between the separators.

It is preferable that the fuel cell has smaller dimensions particularly in the thickness direction to make the size of the entire cell stack as small as possible. Thus, it is desired to reduce the thickness of the respective constituent parts.

For the separators, materials with an easy current flowability such as carbon, metal, etc. are selected, and carbon is used from the viewpoint of corrosion resistance. The smaller the thickness, the better. Thus, it is desirable that the thickness is not more than about 2 mm, preferably not more than 1 mm. Carbon separators of such a thickness have no elongation property and thus are easily breakable by excessive deformation such as deflection, etc.

Positive or negative reactor electrode layer for use in contact with the separator is made from anticorrosive porous carbon capable of passing hydrogen and oxygen as fuels therethrough. The reactor electrode layer has a thickness as small as about 1 mm or less, preferably about 500 $\mu$m or less, more preferably about 300 $\mu$m or less and is also porous and thus hardly withstands deformation due to compression, etc.

Polymeric electrolyte membrane is an ion exchange membrane having a thickness as small as about 1 mm or less, preferably about 500 $\mu$m or less, more preferably about 200 $\mu$m or less, which is even cross-linked and is used in a wet state (gel state). Thus, its strength is small.

Materials for the unit cell constituent parts with such thicknesses are less elongatable and easily breakable by deformation. Thus, rough handling during the cell assembling will give rise to breaking of the constituent parts. Fastening of the fuel cell with a strong force to obtain tight sealing will initiate breaking from the weaker constituent parts.

For the individual unit cells thus formed, it is required to keep the distance between the separators constant and prevent vaporization of water in the polymeric electrolyte membrane, thereby preventing drying of the membrane. TI obtain the necessary sealing to prevent drying, it has been so far proposed to use gaskets (JP-A-7-153480, JP-A-7-226220, JP-A-9-231987, etc.), or use a rubber sheet laminated with a sponge layer as a gasket (JP-A-6-96783, JP-A-7-312223, etc.), or the like.

As to the unit cell fabrication, it is desired that assembling and disassembling of cell constituent members can be made easily, but from the viewpoint of a higher power generation efficiency, assembling of unit cell by curing and fixing the constituent members with an adhesive is a usual means somewhat at the sacrifice of assembling and disassembling workabilities.

However, even in the case of any of the foregoing prior art proposed to obtain tight sealing to prevent drying of the polymeric electrolyte membrane, number of process steps, etc. is considerably increased, resulting in inevitable cost increase, or the resulting fuel cell could not always maintain satisfactory effects throughout the service life. Furthermore, the usual means of assembling the constituent members of unit cell by curing and fixing with an adhesive can attain desired effects only for the initial period, but once the cell members are deteriorated after long service, there will be a difficulty in exchanging the deteriorated members as inconvenience.

DISCLOSURE OF THE INVENTION

An object of the present invention is to provide a fuel cell capable of maintaining a stable power generation efficiency by attaining desired sealing of unit cells, thereby preventing drying of a polymeric electrolyte membrane, with distinguished assembling and disassembling workabilities, easy exchange of deteriorated constituent members, and considerable reduction in production cost.

The present fuel cell comprises a stack of a plurality of unit cells laid one upon another, where the unit cell comprises a pair of counterposed separators, and a membrane-electrode assembly comprising a polymeric electrolyte membrane and two reactor electrode layers each with a catalyst layer sandwiching the polymeric electrolyte membrane, the membrane-electrode assembly being provided between the separators and sandwiched and supported between and by a pair of counterposed resin gasket sheets, and gaskets of inverted V-shape made from cured rubber are integrally formed on outer surfaces of the gasket sheets or inner surfaces of the separators, respectively, and brought into tight contact with the inner surfaces of the separators or the outer surfaces of the gasket sheets, respectively, thereby attaining desired sealing.

In the foregoing structure the membrane-electrode assembly can be supported by a pair of the gasket sheets, and thus the membrane-electrode assembly can be easily and exactly positioned while keeping the specific pressure constant in the unit cell fabrication, thereby considerably improving the working efficiency and handling in the unit cell assembling. Desired sealing can be attained between the separators by the gaskets and maintained stably even if the fuel cell is used as long as its service life. That is, drying due to vaporization of water in the polymeric electrolyte membrane can be prevented and stable power generation efficiency can be obtained.

BEST MODE FOR CARRYING OUT THE INVENTION

Embodiments of the present fuel cell will be described in detail below, referring to drawings.

Figure 1:
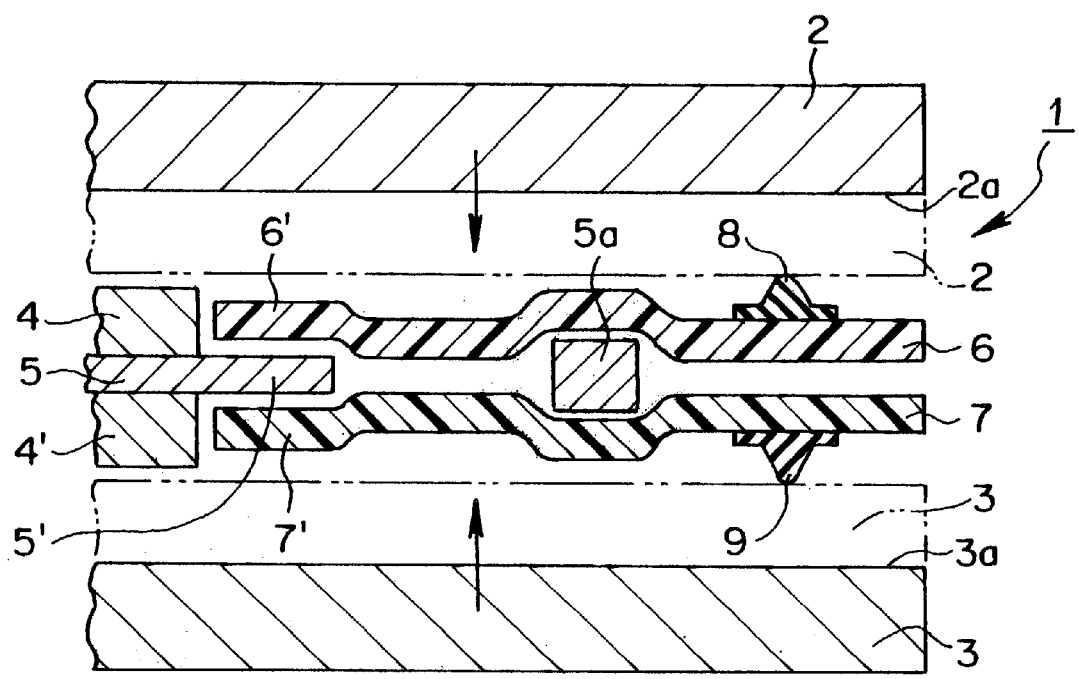
FIG. 1 is a vertical cross-sectional view showing the essential part of a unit cell according to a first embodiment of the present invention.

FIG. 1 is a cross-sectional view showing a first embodiment of a unit cell, which constitutes a fuel cell by stacking several tens to several hundred of the unit cells. Unit cell 1 comprises a pair of counterposed separators 2 and 3 of flat rectangular shape and a membrane-electrode assembly (MEA) of likewise flat rectangular shape comprising a polymeric electrolyte membrane 5 and two reactor electrode layers 4 and 4' each with a catalyst layer on surface of or within the reactor electrode layer, the polymeric electrolyte membrane being sandwiched between the reactor electrode layers and MEA being provided between separators 2 and 3.

MEA is supported by polymeric, electrolyte membrane 5 of flat rectangular shape extruded to a sufficient distance from the outer peripheral edge of MEA. Extruded peripheral part 5' of polymeric electrolyte membrane 5 is vertically pinched and lightly supported by inner peripheral pinching parts 6' and 7' of a pair of counterposed elastic resin gasket sheets 6 and 7 of rectangular frame shape together with spacer sheet 5a of e.g. frame or long and narrow plate shape with a predetermined size. That is, MEA is vertically supported in a pressed state by a pair of gasket sheets 6 and 7 through extruded peripheral parts 5' of polymeric electrolyte membrane 5 and spacer sheet 5a, where the distance between inner peripheral pinching parts 6' and 7', i.e. the distance between overhanging inner peripheral edge parts of gasket sheets 6 and 7, is made smaller than the thickness of polymeric electrolyte membrane 5, thereby enabling supporting of extruded peripheral part 5'.

Gaskets 8 and 9 of inverted V-shape cross-section molded from cured rubber are integrally formed on the outer surfaces near outer peripheral edge parts of gasket sheets 6 and 7, respectively. By bringing gaskets 8 and 9 into tight contact with inner surfaces 2a and 3a of separators 2 and 3, desired sealing can be obtained, thereby preventing vaporization of water in the polymeric electrolyte membrane of MEA. Gaskets can be also formed on the inner surfaces of separators, respectively.

The gaskets of inverted V-shape cross-section are made with such dimensions as base width: about 1- about 3 mm and total height: about 0.3–about 1.5 mm. To make the gasket apex into an inverted V-shape is to makes smaller a contact area with the counter seal surface (surface to be sealed), thereby attaining desired sealing with a smaller fastening force. It is preferable to set a vertical angle of the gasket apex to about 40°–about 60° for improving the sealing. Furthermore, soft materials with a hardness (JIS A) of 60 or less are used for the gaskets, and thus uniform and compatible sealing of the counter seal surfaces can be attained with a smaller fastening force. Such secure sealing can effectively prevent leakage of water vapor or liquids from the inside to the outside of the cell.

Gaskets of low-hardness materials with small base width and height are not stable in the shape as single pieces and are very hard to handle in the assembling and also hard to accurately provide in desired positions, and thus are integrated with gasket sheets, respectively, to reinforce the soft gaskets and facilitate their handling.

By using the integrated members of gasket-gasket sheet, unit cells can be fabricated stepwise. At first, two integrated members of gasket-gasket sheet are counterposed to each other so that the gaskets can face each other, and the extruded peripheral part of a polymeric electrolyte membrane is inserted into between the inner peripheral pinching parts of the frame-shaped rectangular gasket sheets, followed by heat welding, thereby integrating the integrated members with MEA. Spacer sheet can be inserted into between the gasket sheets at the same time. Then, the resulting integrated assembly is sandwiched between two upper and lower separators to form a unit cell.

The unit cells thus formed are stacked together in an accurate position without any damage to the reactor electrode layers, polymeric electrolyte membrane and gaskets, each with low strength.

The fuel cell of the foregoing structure according to the present embodiment has following effects. MEA is supported by two welded gasket sheets through polymeric electrolyte membrane 5 and spacer sheet 5a, and thus in each unit cell assembling, MEA can be easily and accurately positioned while keeping the specific pressure constant, thereby increasing the workability and handling efficiency considerably in the unit cell assembling. Desired sealing can be attained between separators 2 and 3 by gaskets 8 and 9 and thus the sealing can be stably maintained therebetween even for a long service period of fuel cell, thereby preventing drying due to vaporization of water in the polymeric electrolyte membrane and ensuring stable power generation efficiency.

Furthermore, gasket sheets 6 and 7 and spacer sheet 5a have predetermined thicknesses, respectively, and thus upper and lower separators 2 and 3 can be maintained at a constant distance therebetween even if the gasket sheets and the spacer sheet are sandwiched between the upper and lower separators, thereby preventing MEA of fragile materials from breaking.

Figure 2:
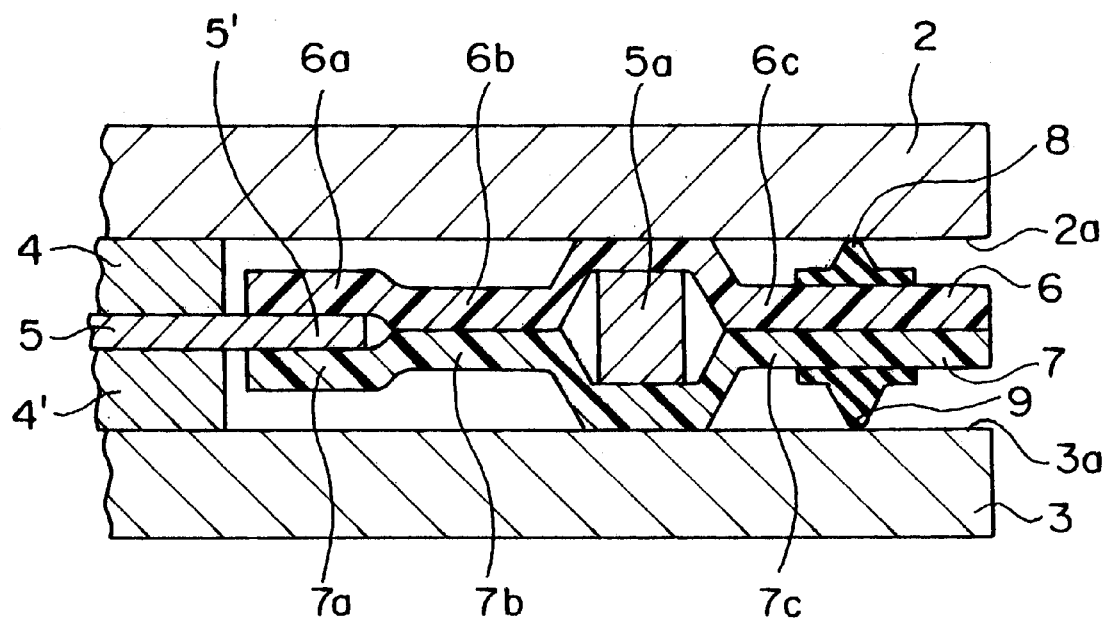
FIG. 2 is a vertical cross-sectional view showing the essential part of a unit cell when assembled into a fuel cell.

FIG. 2 is a vertical cross-sectional view showing the essential part of sealed unit cell when assembled into a fuel cell. In the unit cell assembling, inner edge parts 6a and 7a (corresponding to overhanging inner peripheral pinching parts 6' and 7', respectively) are welded or heat welded together so as to pinch extruded peripheral part 5' of the polymeric electrolyte membrane, and also undeformed parts of the counterposed gasket sheets 6b–7b and 6c–7c are welded together. For the gasket sheets, polyester films, polyamide films, polyimide films, polyethylene naphtalate films, etc. having a thickness of about 1 mm or less, preferably about 200 $\mu$m or less, more preferably about 50 $\mu$m or less, can be used.

The present invention will be described below, referring to a specific example.

To support MEA, polymeric electrolyte membrane 5 having a thickness of 0.2 mm and stainless steel spacer sheet 5a having a thickness of 0.7 mm were used. Polymeric electrolyte membrane 5 was punched to a desired shape, and the extruded peripheral part of polymeric electrolyte membrane 5 from MEA was pinched by the inner peripheral edge parts of the gasket sheets and heat welded together with the spacer sheet, thereby attaining integration.

As materials for forming gasket sheets 6 and 7, a polyester film (Dia foil S 100-100, product made by Mitsubishi Chemical Corp.) was used. The film was punched into a frame shape of desired size.

Furthermore, gaskets 8 and 9 were integrally molded on the outer surfaces of gasket sheets 6 and 7 near the outer peripheral edge parts, respectively, by injection molding or LIM molding. As cured rubber as materials for molding gaskets 8 and 9, rubber with an adhesiveness to the thermoplastic resin film can be preferably used. Any cured rubber can be used as materials for molding gaskets 8 and 9, so long as it has a hardness (JIAA) of 60 or less, preferably 20–40 and so long as it can attain the desired sealing.

Besides rubber of ordinary type, liquid rubber can be also used for the rubber. Rubber of ordinary type for use in the gaskets includes, for example, highly saturated type rubbers such as ethylene-propylene-based rubber, fluororubber, hydrogenated nitrile rubber, etc., highly saturated type thermoplastic elastomers such as hydrogenated styrene-isoprene copolymer, hydrogenated styrene-isoprene copolymer, etc., and so on. Liquid rubber includes, for example, liquid silicone rubber, liquid nitrile rubber, liquid ethylene-propylene-based rubber, liquid fluoro rubber, etc. The rubber is used as integrated with sheets with a low strength, such as separators, electrodes, polymeric electrolyte membrane, etc., and thus liquid rubber moldable under low pressure can be preferably used.

One mode of using liquid rubber as materials for molding gaskets 8 and 9 is given below. Liquid silicone, rubber with a hardness of 5,000–10,000 Pa·s (25° C.) before curing and a hardness (JIS A) of 40 after curing (X-34-1277 A/B, product made by Shin-Etsu Chemical Co., Ltd.) was integrally molded into gaskets 8 and 9 on the outer surfaces of gasket sheets 6 and 7 near the outer peripheral edge parts, respectively, by using a mold heated at 140° C. and retaining the liquid silicone rubber therein for 150 seconds.

Figure 3:
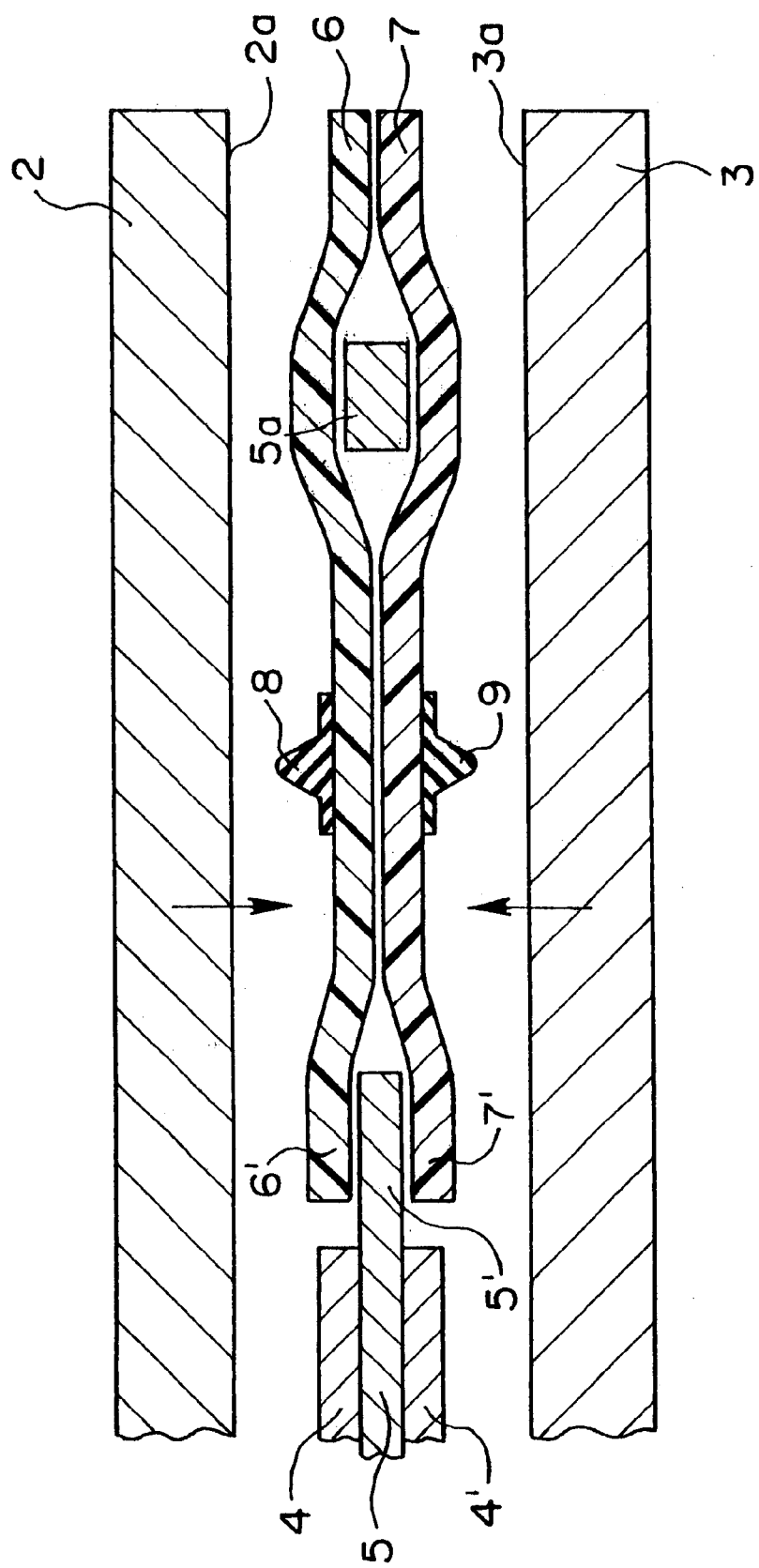
FIG. 3 is a vertical cross-sectional view showing the essential part of a unit cell according to such a case that the gaskets are formed between pinching parts of the gasket sheets and a spacer.

FIG. 3 shows a case of gaskets 8 and 9 formed between inner peripheral pinching parts 6' and 7' of gasket sheets and spacer sheet 5a, where gasket sheets 6 and 7 and separators 2 and 3 are pressed by gaskets 8 and 9 to attain sealing, and thus acid transfer from polymeric electrolyte membrane 5 towards spacer sheet 5a can be effectively prevented, thereby preventing corrosion of spacer sheet 5a by acid.

Figure 4:
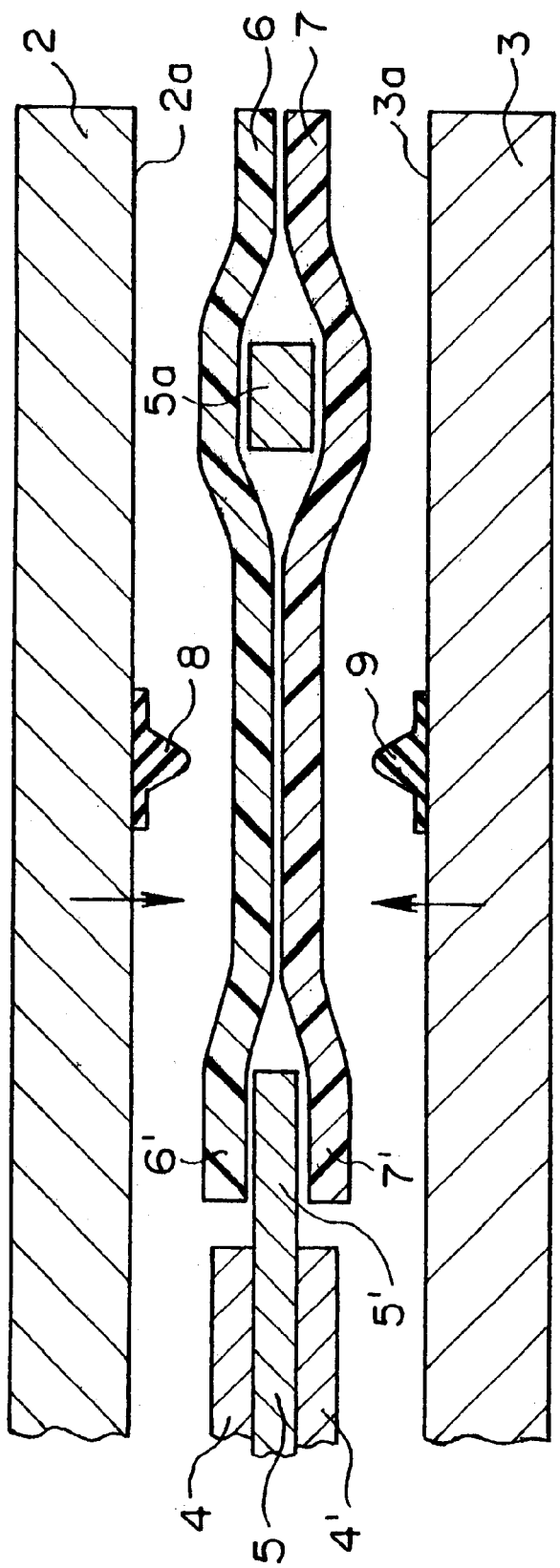
FIG. 4 is a vertical cross-sectional view showing the essential part of a unit cell according to such a case that the gaskets are formed on inner surface of the separators, respectively.

FIG. 4 shows another case of gaskets 8 and 9 formed on inner surfaces 2a and 3a of separators 2 and 3, respectively, where corrosion of the spacer sheet by acid can be prevented.

Figure 5:
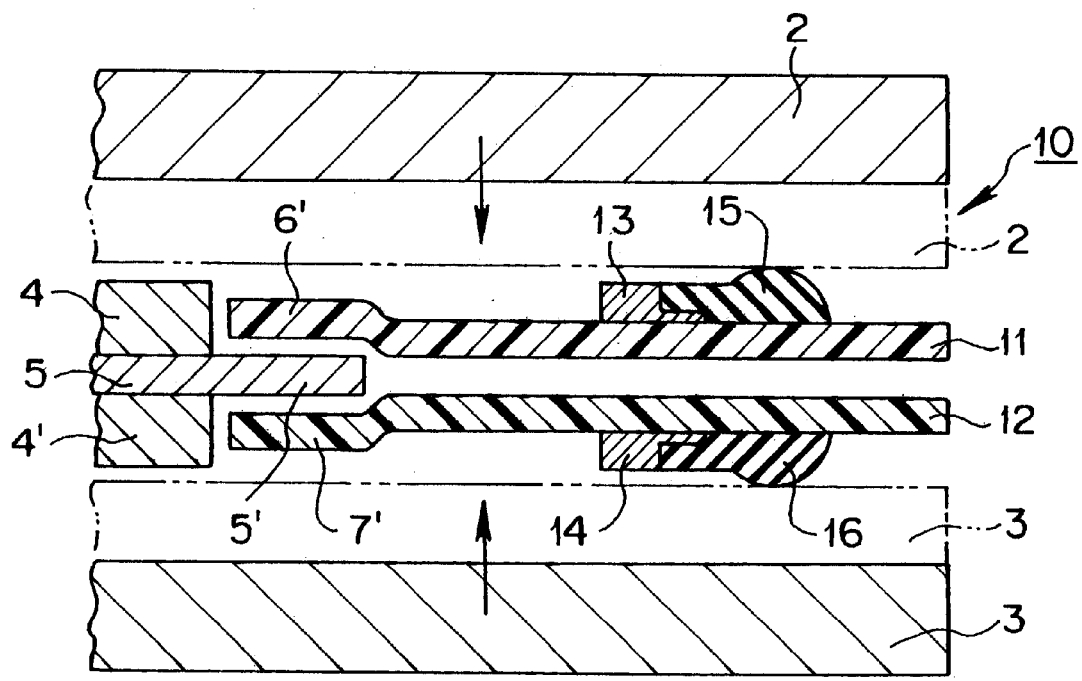
FIG. 5 is a vertical cross-sectional view showing the essential part of a unit cell according to a second embodiment of the present invention.

FIG. 5 is a cross-sectional view of the essential part of unit cell 10 according to a second embodiment of the present invention, where common members to those of unit cell 1 according to the first embodiment of the present invention are identified by the same reference numerals.

In the case of unit cell 10 of the second embodiment, gasket sheets 11 and 12 of different shape from that of gasket sheets 6 and 7 of the first embodiment are used, and spacer sheets 13 and 14 of L-shaped cross-section having predetermined dimensions are provided on the outer peripheral edge parts of gasket sheets 11 and 12, respectively. Gaskets 15 and 16 are integrally molded thereon so as to fix spacer sheets 13 and 14.

The embodiment will be described below, referring to a specific example.

To indirectly support MEA, polymeric electrolyte membrane 5 having a thickness of 0.2 mm and stainless steel spacer sheets 13 and 14 each having a thickness of 0.35 mm were punched to desired rectangular shape and frame shape, respectively, and extruded peripheral part 5' of polymeric electrolyte membrane 5 from MEA was pinched by the inner peripheral edge parts of the gasket sheets with the spacer sheets fixed by the gaskets and heat welded, thereby attaining integration.

As resin materials for forming gasket sheets 11 and 12, a polyester film (Dia foil S 100-100) was used. The film was punched into a frame shape of desired size.

Furthermore, gaskets 15 and 16 were integrally molded on the surfaces of gasket sheets 11 and 12 near the outer peripheral edge parts thereof, respectively, from the same maternal in the same procedure as used in the first embodiment.

Figure 6:
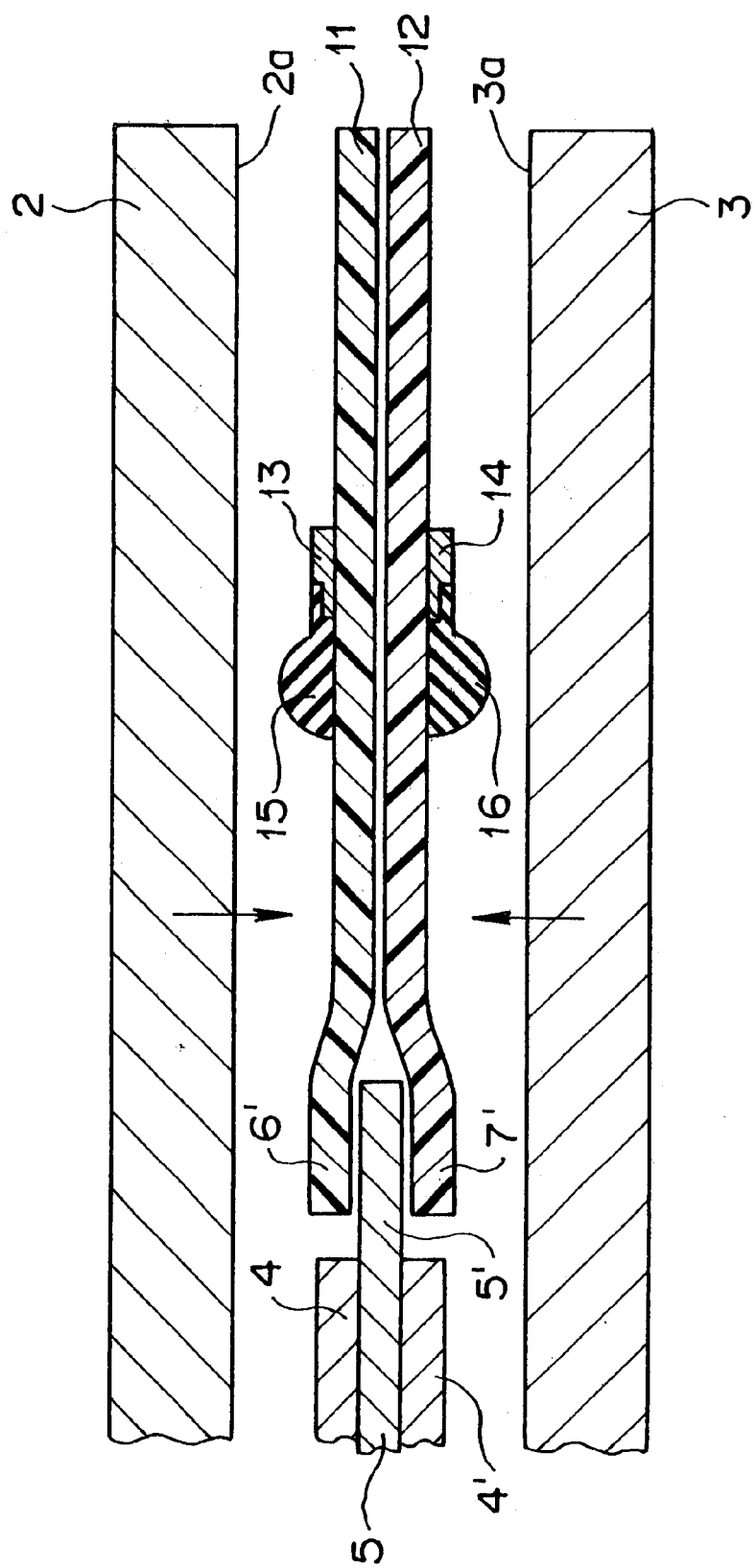
FIG. 6 shows an inverted mode of positional relation between the spacer and the gaskets in the embodiment of FIG. 5.

FIG. 6 shows a case where the positional relationship of spacer sheets 13 and 14 and gaskets 15 and 16 is inverted. With the arrangement of inverted positional relationship, the spacer sheets will have less chances of exposure to acid from polymeric electrolyte membrane 5 and thus problems of spacer sheet corrosion will be hardly encountered.

Figure 7:
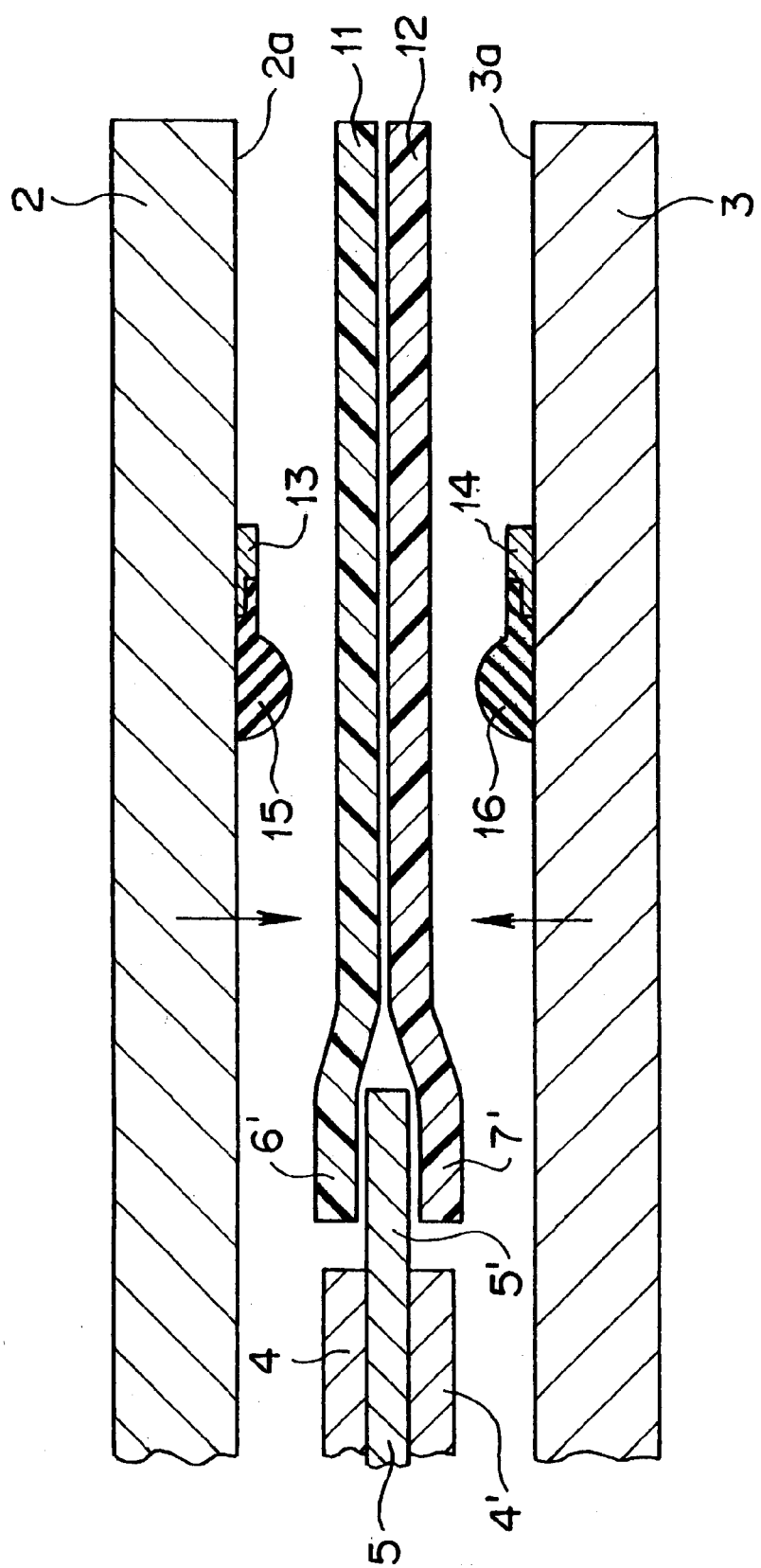
FIG. 7 shows a mode of formation of the spacer and the gaskets on inner surfaces of the separators, respectively, in the embodiment of FIG. 6.

FIG. 7 shows a case where spacer sheets 13 and 14 and gaskets 15 and 16 in the inverted positional relationship of the case of FIG. 6 are provided on inner surfaces 2a and 3a of separators 15 and 16, respectively.

INDUSTRIAL APPLICABILITY

In the present fuel cell, the membrane-electrode assembly (MEA) is supported by a pair of gasket sheets and thus the membrane-electrode assembly can be easily and exactly positioned while keeping the specific pressure constant in the unit cell fabrication, thereby considerably improving the workability and handling efficiency in the unit cell assembling, further with distinguished assembling and disassembling workabilities, easy exchange of deteriorated constituent members, and considerable reduction in production cost as advantages.

Furthermore, desired sealing can be attained between separators by gaskets and maintained stably even if the fuel cell is used as long as its service life. That is, drying of the polymeric electrolyte membrane due to vaporization of water therein can be prevented and stable power generation efficiency can be obtained.

What is claimed is:

1. A fuel cell, which comprises a stack of a plurality of unit cells laid one upon another, the unit cell comprising a pair of counterposed separators and a membrane-electrode assembly comprising a polymeric electrolyte membrane and two reactor electrode layers each with a catalyst layer sandwiching the polymeric electrolyte membrane, the membrane-electrode assembly being provided between the separators, characterized in that the membrane-electrode assembly is sandwiched and supported by a pair of counterposed resin gasket sheets holding a spacer sheet having a predetermined thickness, and gaskets of inverted V-shape made from cured rubber, are formed on outer surfaces of the gasket sheets or inner surfaces of the separators, respectively, and brought into tight contact with the inner surfaces of the separators or the outer surfaces of the gasket sheets, respectively, thereby attaining sealing.

2. A fuel cell according to claim 1, wherein the polymeric electrolyte membrane having a predetermined thickness is extruded outwardly from the peripheral edge of the membrane-electrode assembly, and the extruded peripheral part of the membrane-electrode assembly is pinched by a pair of the counterposed gasket sheets, thereby supporting the membrane-electrode assembly, while maintaining the separators at a predetermined distance therebetween.

3. A fuel cell according to claim 2, wherein the extruded peripheral part of the polymeric electrolyte membrane is pinched by overhanging inner pinching edge parts of a pair of the counterposed gasket sheets.

4. A fuel cell according to claim 1, wherein the spacer sheet is provided between the inner peripheral pinching edge parts of the gasket sheets and the gaskets.

5. A fuel cell according to claim 1, wherein the gaskets are formed between the inner peripheral pinching edge parts of the gasket sheets and the spacer sheet.

6. A fuel cell according to claim 1, wherein the gaskets are integrated with the gasket sheets, respectively.

7. A fuel cell according to claim 1, wherein the gaskets are integrally formed together with spacers, respectively.

8. A fuel cell according to claim 1, wherein the gaskets are made from cured rubber having a hardness (JIS A) of 60 or less.

9. A fuel cell according to claim 8, wherein the cured rubber is a cured product of liquid silicone rubber, liquid nitrile rubber, liquid ethylene-propylene-based rubber or liquid fluororubber.

* * * * *